(12) United States Patent
Kalwa et al.

(10) Patent No.: US 10,955,357 B2
(45) Date of Patent: Mar. 23, 2021

(54) METHOD FOR PRODUCING AN OSB (71) Applicant: SWISS KRONO TEC AG, Lucerne (CH)

(72) Inventors: Norbert Kalwa, Horn-Bad Meinberg (DE); Torsten Kopp, Marnitz (DE)

(73) Assignee: SWISS KRONO TEC AG, Lucerne (CH)

( * ) Notice: Subject to any disclaimer, the term of this patent is extended or adjusted under 35 U.S.C. 154(b) by 53 days.

(21) Appl. No.: 15/780,515

(22) PCT Filed: Mar. 3, 2017

(86) PCT No.: PCT/EP2017/055079
§ 371 (c)(1),
(2) Date: May 31, 2018

(87) PCT Pub. No.: WO2017/153297
PCT Pub. Date: Sep. 14, 2017

(65) Prior Publication Data
US 2018/0372651 A1 Dec. 27, 2018

(30) Foreign Application Priority Data

Mar. 10, 2016 (EP) ...................................... 16159708

(51) Int. Cl.
*B27N 3/14* (2006.01)
*B27N 3/04* (2006.01)
(Continued)

(52) U.S. Cl.
CPC ............ *G01N 21/8986* (2013.01); *B27N 3/04* (2013.01); *B27N 3/143* (2013.01); *B27N 7/00* (2013.01);
(Continued)

(58) Field of Classification Search
CPC ..... B27N 3/00; B27N 3/04; E04C 2/16; D21J 1/00; B32B 21/06; B32B 21/02; B32B 29/005
See application file for complete search history.

(56) References Cited

U.S. PATENT DOCUMENTS 2,888,359 A * 5/1959 Jorgensen ................ C09D 5/34
264/36.11
4,364,984 A 12/1982 Wentworth
(Continued)

FOREIGN PATENT DOCUMENTS

DE 2513764 10/1976
DE 19624778 1/1998
(Continued)

OTHER PUBLICATIONS

International Search Report in related International Application No. PCT/EP2017/055079 dated May 31, 2017, 9 pages.
(Continued)

*Primary Examiner* — Marc C Howell
*Assistant Examiner* — Nicholas J Chidiac
(74) *Attorney, Agent, or Firm* — Andrew M. Calderon; Roberts Calderon Safran & Cole, P.C.

(57) ABSTRACT

The invention relates to a method for producing an OSB, wherein a scattered mat formed by strands adhered in multiple layers is pressed in a hot press to form a panel with a desired thickness, comprising the following steps: a) scanning the surface of an upper side of the mat or of the pressed panel to determine uneven areas and/or faults; b) determining position data of the determined uneven areas and/or faults; c) determining the volumes of the individual uneven areas and/or faults; d) targeted filling of the uneven areas and/or faults with a filling material, based on the
(Continued)

determined position data and volumes, wherein e) the filling material is scattered with a scattering device.

27 Claims, 4 Drawing Sheets

(51) Int. Cl.
*G01N 21/898* (2006.01)
*G01N 21/89* (2006.01)
*G01B 11/30* (2006.01)
*B27N 7/00* (2006.01)
*G01N 21/88* (2006.01)

(52) U.S. Cl.
CPC ............ *B27N 7/005* (2013.01); *G01B 11/306* (2013.01); *G01N 21/8901* (2013.01); *G01N 2021/8861* (2013.01); *G01N 2021/8874* (2013.01); *G01N 2021/8908* (2013.01)

(56) References Cited

U.S. PATENT DOCUMENTS

| | | | |
|---|---|---|---|
| 4,614,555 A | 9/1986 | Smith et al. | |
| 4,984,172 A * | 1/1991 | Luminari | B27G 1/00 144/332 |
| 6,010,793 A | 1/2000 | Yoshimura et al. | |
| 6,548,109 B1 * | 4/2003 | Hagquist | B05D 1/045 427/195 |
| 10,220,597 B2 * | 3/2019 | Velez | B32B 3/30 |
| 2006/0137169 A1 | 6/2006 | Boehm et al. | |
| 2010/0331458 A1 * | 12/2010 | Cernohous | C08L 51/06 524/14 |
| 2011/0194735 A1 | 8/2011 | Massen | |
| 2014/0017452 A1 * | 1/2014 | Pervan | E04F 15/043 428/172 |
| 2014/0046471 A1 | 2/2014 | Bamford et al. | |
| 2015/0202790 A1 * | 7/2015 | Patterson | B01F 3/14 427/140 |
| 2017/0246843 A1 * | 8/2017 | Velez | B32B 3/30 |

FOREIGN PATENT DOCUMENTS

| | | | |
|---|---|---|---|
| DE | 10223831 | 12/2002 | |
| DE | 102005038833 | 2/2007 | |
| DE | 102008048383 | 3/2010 | |
| DE | 102010049638 | 5/2012 | |
| EP | 1136636 | 9/2001 | |
| EP | 1136636 A1 * | 9/2001 | ............ B27N 7/005 |
| EP | 1749587 | 2/2007 | |
| EP | 2239116 | 10/2010 | |
| EP | 2915640 | 9/2015 | |
| RU | 2005107409 | 8/2006 | |
| RU | 2007117461 | 11/2008 | |
| WO | 2004072748 | 8/2004 | |

OTHER PUBLICATIONS

Written Opinion of the International Searching Authority in related International Application No. PCT/EP2017/055079, 6 pages.

* cited by examiner

METHOD FOR PRODUCING AN OSB

1. FIELD OF THE INVENTION

The invention relates to a method for producing an OSB in which a mat which is scattered from a plurality of layers of glued strands is pressed in a hot press to form a panel of a desired thickness.

2. DISCUSSION OF BACKGROUND INFORMATION

Such a method is known, for example, from DE 10 2005 038 833 B4 or EP 2 915 640 A1.

Because of its good mechanical properties, an OSB (Oriented Strand Board) is possible for a multiplicity of applications for which plywood is currently used. An OSB is distinguished by the fact that it has long strands which cross over from layer to layer, running alternately in the longitudinal direction and in the transverse direction of the outline. The strands have a length of 70 to 200 mm, a width of 6 to 30 mm and a thickness of 0.3 to 1.2 mm. Softwood or hardwood is used as the material, wherein the portion of wood in the finished panel is between 90% and 98%. The orientation of the chips in the individual layers is implemented by scattering assemblies which are arranged one behind the other. As a result of the use of the strands, an OSB does not have, in contrast to a plywood panel, a smooth surface which can therefore be easily coated, but rather the surface contains uneven portions and/or defects.

The OSB which is known from EP 1 136 636 A1 is used as shuttering panel. In order to obtain a smooth surface, fibers or chips are scattered onto the last strand layer, which fibers or chips are intended to compensate the uneven portions of the surface of the core, in order to obtain a surface which is as flat as possible. This fine covering layer is composed of an extremely fine wood material which was acquired after a sieve mesh width which is less than 0.5 mm. A paper layer is placed on the fine chip layer, and all the layers are pressed together in a high-speed press, wherein the core is made to flow under pressure and heat, and therefore adhesion occurs between the phenol paper and the core.

The fact that the scattering direction of the strands of one layer is rotated through 90° with respect to the next results in a high flexural strength of the OSBs, which makes OSBs interesting for many applications in the field of construction. A further advantage is that an OSB has, particularly when softwoods are used, a lower bulk density in comparison with other wood materials. This makes OSBs the product of choice also for applications in vehicle construction. In addition, OSBs can be produced in lengths and widths which minimize, for example, the expenditure on assembly when producing a truck load area.

Owing to the geometry of the strands and their scattering, a smooth or even continuous surface is not produced on the finished OSB but instead the OSB has a surface structure with a large number of depressions, in some instances up to approximately 4 mm. This surface structure prevents coating of OSBs with technologies which are customarily used with other wood materials, such as for example the lamination of papers impregnated with urea and/or melamine resin, or the lamination of finishing films etc. Therefore, OSBs are not available for many applications which would be economically of interest. In addition to applications for concrete shuttering and load areas of trucks, flooring, vehicle flooring and side paneling of transportation vehicles are conceivable.

The surface which is heavily patterned and which depends on the length, thickness and shape of the strands cannot be reproduced and does not permit use without coating, which is possible with plywood panels. As a result, for example, problems occur with the cleaning capability and as a result of the evaporation of constituents of the wood, which many people experience as unpleasant.

One possible way of generating a smooth surface is to install additional scattering devices for fine chips into an OSB production line. However, this involves extensive investment for the manufacture of the chip, for preparation of the chip and gluing of the chip. In existing production operations, there is no space for such installations in many OSB lines, so that this possibility is ruled out for most producers. Even in the case of new installations it is unclear what percentage of the overall production is to be provided with such an optimized covering layer, so that such an investment has to be considered as entailing a considerable risk.

U.S. Pat. No. 4,364,984 A discloses an OSB with a five-layered structure, wherein the lower and upper covering layer has significantly finer chips compared to the strands of the core.

DE 25 13 764 A1 discloses a method for producing a wooden panel in which a mixture of adhesive, plastic and wood flour is applied as powder to the sides of the wooden panel to be coated and is then pressed with the wooden panel. Such a panel can subsequently be coated with a decorative paper, a PVC film or a veneer in order to be used as a furniture panel.

U.S. Pat. No. 4,614,555 A discloses a method for improving the defects in the upper side of a plywood panel. The defects are scanned and their size, their configuration and their position are sensed precisely. The defect is then processed by milling and a depression is generated by correspondingly milling out the upper veneer leaf. The depression which is produced by milling is then filled in with a fluid filler, and the surface can subsequently be ground.

DE 10 2010 049 638 A1 discloses a method for optically configuring the wooden surface of a panel which has a defective area. The defective area is initially improved and detected in its position. The position of the defective area is subsequently communicated to a printing device which imprints a corresponding printed image onto the improved defective area. Electromagnetic waves of an x-ray unit are used to detect the defective area.

DE 102 23 831 A1 discloses a method for processing glue binders and other wood materials which are composed of a multiplicity of layers which are glued one on top of the other. Defects in the individual layers, in particular at the visible faces, are determined by means of a scanning element. A control element, in the memory of which the coordinates of the defects are stored, controls a milling tool which removes the defects in predetermined shapes by processing. Filler elements are then inserted into the defects which have been removed by processing, and are glued therein.

DE 10 2008 048 383 A1 discloses an automatic system for patching faces with natural patterning as is present in the wooden paneling. After the automatic detection and patching of the defects by filling or plugging with dowels, the patched area which is visible in a disruptive fashion is decorated by means of a digitally controlled decoration process. For this purpose, an inkjet printer is used which applies local decoration patterns on the basis of the global color features and structure features of the panel and the local color features and structure features of each individual fault region, said decoration patterns preventing the defect from no longer being viewed as such and providing the panel with a desired esthetic appearance both locally and globally.

EP 2 239 116 A2 describes a method for automatically patching defects, which method permits geometrically precise and highly sensitive determination of the location of defects even in non-planar panels. The defects are detected using an optical image recorder and are filled in or eliminated with a computer-controlled tool, wherein the tool is controlled using the defect positions which are determined by the optical image recorder. In addition, a vertical measurement of the position of the surface of the panel is carried out by means of a vertical measuring device, and the local height of the defects is determined on the basis of the vertical measurement.

WO 2004/072748 A12 describes a method for all round processing of a blank with a processing machine such as, for example, a milling machine. The all round processing is carried out in accordance with a three-dimensional template. The blank can be, for example, a turbine blade made of metal or a ceramic material.

The material OSB is being refused from penetrating the market to a reasonable degree as long as its upper side can not be provided with a smooth, coatable surface using simple and cheap methods.

Application of an additional fine chip layer to the upper side, the filling in of the uneven portions and/or defects and the coating with a plurality of resin-impregnated papers or the grinding away have indeed been trialed but have not been implemented owing to excessively high costs or a difficulty in respect of practical application. Therefore, OSBs are not possible for higher-quality applications and they are therefore for the most part marketed in unmodified form as an uncoated panel for simple applications.

Taking this problematic situation as a starting point, the invention is based on the object of providing a method for producing an OSB with a smooth surface, which method is cost-effective and simple to implement.

SUMMARY OF THE INVENTION

In order to solve the problem, the following steps are carried out according to the invention:
a) scanning the surface of an upper side of the mat (1) or of the pressed panel in order to determine uneven portions and/or defects,
b) determining position data of determined uneven portions and/or defects,
c) determining the volumes of the individual uneven portions and/or defects,
d) targeted filling in of the uneven portions and/or defects with a filler on the basis of the determined position data and volumes in that
e) the filler is scattered on with a scattering device.

By means of this refinement the depressions which result from uneven portions and/or defects can be selectively filled in by means of a selective supply of a filler. The steps can be executed in succession in a computer-assisted fashion without an intermediate intervention by operators. The scanner digitizes the surface, using a computer which records this data and correspondingly processes it into a type of digital map of the surface with x and y values for the position in conjunction with z values so that the volume to be filled is then inferred from said x, y and z values via the area and depth. This digital data is then used to control the position and/or quantity of filler.

A particular advantage of this method is that by sensing the surface geometry by means of a scanner/software said surface geometry can also be taken into account during later processing steps. In the case of later cutting to size of the panels which, under certain circumstances, are then coated, the defects in the panel can be taken into account during the incision process. Uneven portions and/or defects can be performed either in the upper side of the mat, that is to say still before the pressing or on the upper side of the pressed panel which is still part of the strand (that is to say not divided), that is to say downstream of the press, or at an OSB which has been sawn out of a strand and has been specially provided for this purpose.

The filler which is scattered on with the scattering device is preferably a mixture of wood dust and a powder of a duroplastic resin.

It may be perfectly appropriate for uneven portions and/or defects to be filled in only starting from a defined area and/or depth if, for example, a further coating of the upper side with a covering layer is provided, so that relatively small uneven portions can be certainly tolerated. The volume from which (area× depth) filling in is to be carried out can be predefined by the setting of the parameters.

The position data and the distribution of the uneven portions and/or defects are preferably stored and used in a further processing operation of the OSB. The position and the distribution can be stored in a plate-related fashion by means of software and be therefore used for later processing steps.

Preferably a line scanner is used to scan the surface.

In order to homogenize the surface after the filling in of the uneven portions and/or defects, a complete layer of a mixture of wood flour and a duroplastic resin is preferably additionally scattered onto the upper side.

For this purpose it may be advantageous as already mentioned to tolerate certain uneven portions and/or defects. The scattering of the filler is controlled "by means of the scanner", that is to say the data which are determined by means of the scanner is used. If the filling in is limited to the relative large holes, the effectiveness of the device is increased. The large-area scattering on can also take place only in certain areas if appropriate.

An impregnated paper layer can be placed on the filled in panel. A layer of a mixture of wood flour and duroplastic resin can then preferably be scattered onto this impregnated paper layer and a further resin-impregnated paper layer can be placed on the scattered-on layer.

If uneven portions and/or defects are preformed in the surface of the mat or of the panel strand which is not yet divided up, the surface is subsequently pressed into its final smooth form in a Conti press. If a panel which is already divided up is coated, the through hardening is performed in a high-speed press.

A melamine resin or a phenol resin is preferably used as the resin. A mixture of melamine resin and phenol resin can also be used.

The portion of wood flour in the filler is preferably 30 to 60% by weight. The moisture content of the mixture should be less than 5% so that a powder which can be trickled is present.

The filler can contain further additives which can be color pigments and/or reinforcement fibers and/or flame retardants. The addition of specific additives can entirely or partially avoid here use in the entire panel, wherein the addition of additives advantageously should take place during the scattering over a surface.

The mixture of the components should take place just before use. Suitable hardeners can be added to the duroplastic powder resins. The upper side of a panel which is produced without paper can finally be surface-coated.

As described above, both upper sides of a pressed panel can be treated. Initially the surface of the first upper side is to be treated and through hardened here before the second upper side (underside) is correspondingly treated.

The through hardening preferably takes place at a temperature of 200° C., a pressure of 30 kg/cm² and a pressing time of 40 seconds.

BRIEF DESCRIPTION OF THE DRAWINGS

Exemplary embodiments are to be described below in more detail using a drawing, in which.

DETAILED DESCRIPTION OF THE PRESENT INVENTION

Figure 3:
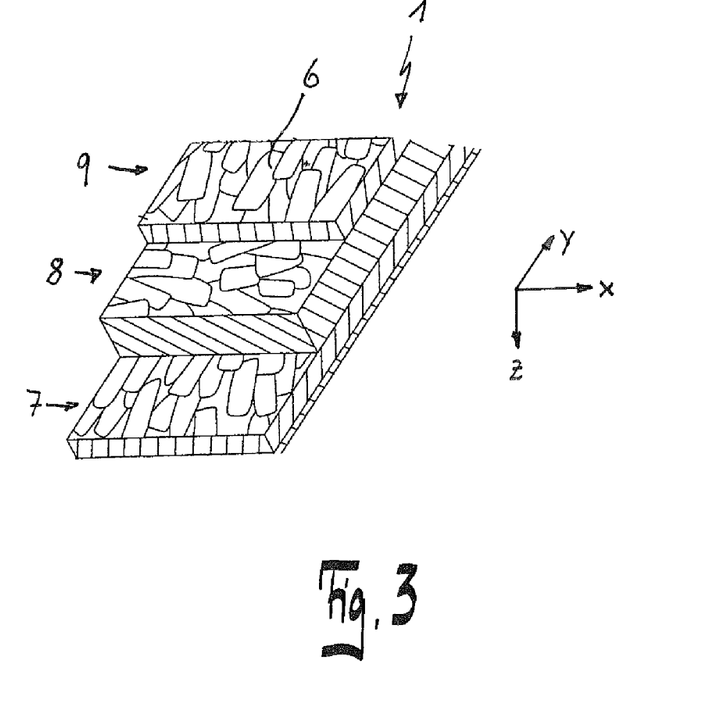
FIG. 3 shows the simplified perspective illustration of the structure of a mat or of an OSB.

At least three layers 7, 8, 9 of glued strands 6 are scattered on an endless, driven conveyor belt to form a mat 1, wherein the orientation of the strands 6 changes by 90° in adjacent layers 7/8, 8/9. This scattered mat 1 is subsequently pressed in a hot press to form a panel 10 of a desired thickness. As a result of the different orientation of the strands 6 and depending on their irregular geometry (length, width, thickness and shape), neither the scattered surface of the upper side 11 of the mat 1 nor the surfaces 11 of the panel 10 which is pressed from the mat 1 are smooth, but rather said surface has uneven portions 19 and/or defects. These uneven portions 19 and/or defects are sensed either in the mat 1 or in a panel 10 by means of a scanner 30 and are subsequently filled with a filler 15 and thoroughly hardened in order to equalize the surface, which will be described in more detail below.

Exemplary Embodiment 1

Figure 1:
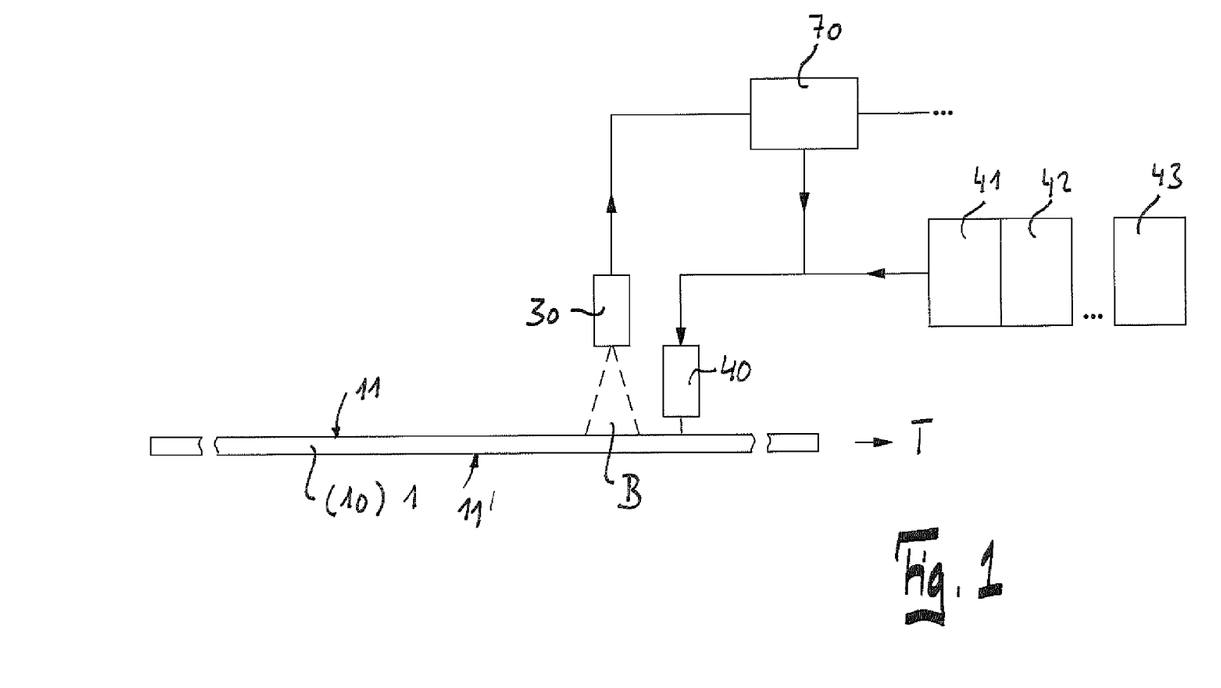
FIG. 1 shows the schematic illustration of a first production system.

An OSB 10 with a large format (length 2800 mm, width 2070 mm, thickness 29 mm) or an OSB strand is fed through in the direction T on a conveyor belt (not illustrated here) under a scanner 30 which scans the surface of the upper side 11. The scanner 30 has a plurality of measuring heads. All the uneven portions/depressions 19 and/or defects are sensed here and stored using software. The volumes (area×depth) of each individual uneven portion 19 or defect are determined by means of the software and stored together with the position data determined during the scanning. The uneven portions 19 which exceed a depth of 2 mm and have a surface extent of more than 25 mm are filled with a filler 15 using a scattering assembly 40 which is located behind the scanner 30. The filler 15 is composed of a mixture of wood flour and phenol resin powder with a weight ratio of 1:1. The thickness of the scattered mixture is 0.4 g/cm³.

Figure 4:
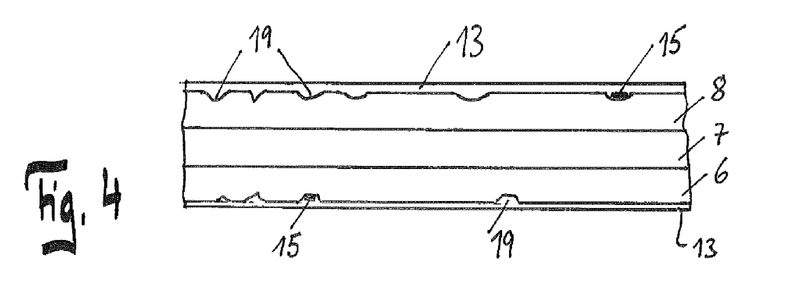
FIG. 4 shows the simplified side view of a first OSB.

In order to take into account the subsequent compression, in each case 30% is scattered over with respect to the volume of the depression. The scattering assembly 40 fills the uneven portion centrally in each case, which gives rise to the formation of (elongate) pyramid-shaped heaps of powder. Subsequently, pre-compression of the filler 15 is performed using a roller 50 which is guided on to the OSB 10 while applying pressure thereto. Subsequently thereto, a paper layer 13 which is impregnated with phenol resin and which has a final weight of 450 g/m² is placed on the upper side 11, and the structure is pressed in a hot press 80 for 40 seconds at a temperature of 200° C. and a pressure of 30 kg/cm². The underside 11' of the OSB can then be treated like the upper side 11, so that the OSB 10 is coated on two sides. Insofar as the requirements permit, that only one of the sides 11, 11' is absolutely flat, a phenol-resin-impregnated paper layer 13 could also be applied immediately to the underside 11' without the uneven portions 19 and/or defects having been previously filled with a filler 15 beforehand.

The scattering assembly 40 is fed with wood flour, phenol resin powder and any additives which are contained in supply containers 41, 42, 43. The number of supply containers 41, 42, 43 is dependent on the mixture which is to be produced. The scanner 30, which can sense a surface region B on the upper side 11 owing to a plurality of measuring heads, is, like the scattering assembly 40, connected to a computer 70 which takes over the control of the system. By means of this computer 70 it is also possible to control the composition of the filler 15. The position data of the uneven portions 19 and/or defects which are sensed during the scanning are stored in the computer 70 and can be taken into account during the further processing of the OSB 10. It is therefore possible to take into account the defects, for example during the division of the OSB 10 into relatively small panels.

The quantity of filler 15 and/or the time period in which filler 15 is scattered can be determined by determining the volumes of the uneven portions 19 and/or defects, and the scattering device 40 is controlled accordingly by the computer 70.

Exemplary Embodiment 2

Figure 2:
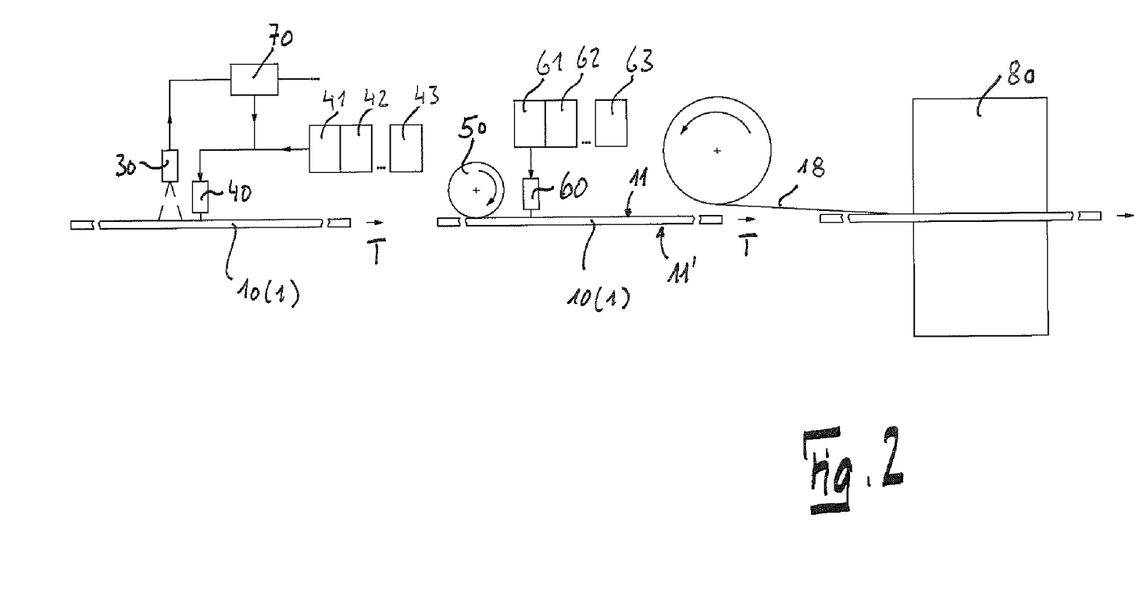
FIG. 2 shows the schematic illustration of a second production system.
Figure 5:
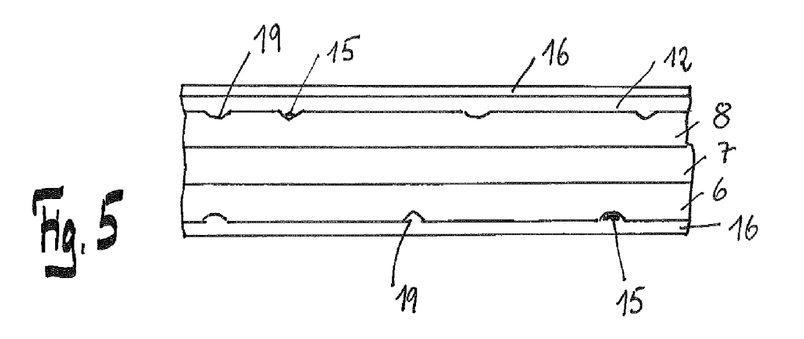
FIG. 5 shows the simplified side view of a second OSB.

An OSB 10 with a large format (length 2800 mm, width 2070 mm, thickness 29 mm) or an OSB strand is fed through in the direction T on a conveyor belt (not illustrated here) under a scanner 30 which scans the surface of the upper side 11. The scanner 30 has a plurality of measuring heads. All the uneven portions/depressions 19 and/or defects are sensed here and stored using software. By means of the software, the volumes (area×depth) of each individual uneven portion 19 or defect are determined and stored together with the position data. The uneven portions 19 which exceed a depth of 2 mm and have a surface extent of more than 25 mm are filled with a filler 15 using a scattering assembly 40 which is located behind the scanner 30. The filler 15 is composed of a mixture of wood flour and phenol resin powder with a weight ratio of 1:1. The density of the scattered mixture is 0.4 g/cm³. In order to take into account the subsequent compression, in each case 30% is scattered over with respect to the volume of the depression. The scattering assembly 40 fills the uneven portion centrally in each case, which gives rise to the formation of (elongate) pyramid-shaped heaps of powder. Subsequently, pre-compression of the filler 15 is performed using a roller 50 which is guided on to the OSB 10 while applying pressure thereto. After pre-compression a quantity of 80 g/m² of the mixture with the same composition as the filler 15 is scattered onto the entire surface of the upper side 11 by means of a further scattering device 60, with the result that a layer 12 of a wood powder-resin mixture is set. A phenol resin paper 16 with a final weight of 250 g/m² is then placed on this layer 12. This structure is then pressed together with a phenol-resin-impregnated force paper on the underside 11' of the OSB in the press 80. The phenol-resin-impregnated force paper has a final weight of 450 g/m². The press temperature is also 200° C. here, the pressing pressure 30 kg/cm² and the pressing time 40 seconds.

The scattering devices 40, 60 are fed with wood flour, phenol resin powder and any additives which are contained in supply containers 41, 42, 43, 61, 62, 63. The number of supply containers 41, 42, 43, 61, 62, 63 is dependent on the mixture which is to be produced. The scanner 30, which can sense a surface region B on the upper side 11 owing to a plurality of measuring heads, is, like the scattering assembly 40, 60, connected to a computer 70 which takes over the control of the system. The composition of the filler 15 can also be controlled by means of this computer 70. The position data of the uneven portions 19 and/or defects which are sensed during the scanning are stored in the computer 70 and can be taken into account during the further processing of the OSB 10. It is therefore possible to take into account the defects, for example during the division of the OSB 10 into relatively small panels.

The quantity of filler 15 and/or the time period in which the filler 15 is scattered can be determined by determining the volumes of the uneven portions 19 and/or defects, and the scattering assembly 40, 60 is controlled accordingly by the computer 70.

Exemplary Embodiment 3

Figure 6:
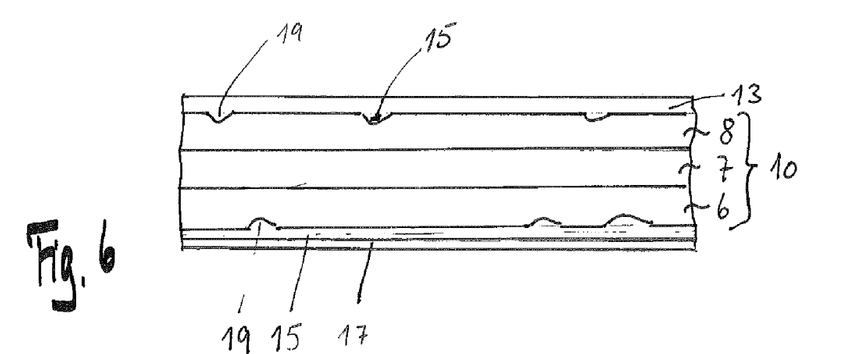
FIG. 6 shows the simplified side view of a third OSB.

The filler 15 is scattered onto a paper layer 17. The OSB 10 is then placed theron. Filler 15 is scattered onto the upper side 11 with the scattering assembly 60. The paper layer 13 is placed onto the filled-in uneven portions and/or defects 19. This structure is thus finally pressed in the press.

LIST OF REFERENCE SYMBOLS

| | |
|---|---|
| 1 | Mat |
| 6 | Strand |
| 7 | Layer |
| 8 | Layer |
| 9 | Layer |
| 10 | OSB |
| 11 | Upper side |
| 11' | Underside |
| 12 | Layer |
| 13 | Paper layer |
| 14 | Layer |
| 15 | Filler |
| 16 | Paper layer |
| 17 | Paper layer |
| 19 | Uneven portion/defect |
| 30 | Scanner |
| 40 | Scattering device |
| 41 | Reservoir container |
| 42 | Reservoir container |
| 43 | Reservoir container |
| 50 | Roller |
| 60 | Scattering device |
| 61 | Reservoir container |
| 62 | Reservoir container |
| 63 | Reservoir container |
| 80 | Press/hot press |
| B | Surface region |
| T | Transportation direction |
| x, y, z | Coordinates |

The invention claimed is:

1. A method for producing an oriented strand board (OSB) in which a mat which is scattered from a plurality of layers of glued strands is pressed in a hot press to form a panel of a desired thickness, comprising:

scanning a surface of an upper side of the mat or of the pressed panel in order to determine uneven portions and/or defects, determining position data of the determined uneven portions and/or defects, determining volumes of the individual uneven portions and/or defects, targeted filling in of the uneven portions and/or defects with a filler on the basis of the determined position data and the volumes in that the filler is scattered on with a scattering device, taking into account a subsequent compression when filling in of the uneven portions and/or defects with the filler, over filling the uneven portions and/or the defects with the filler to form a pyramid-shaped heap of powder and subsequently, pre-compressing the filler using a roller with pressure applied thereto, and after the pre-compression a quantity of a same composition of the filler is scattered onto an entire surface of the upper side.

2. The method as claimed in claim 1, wherein the filler is a mixture of wood dust and a powder made of a duroplastic resin.

3. The method as claimed in claim 1, wherein a line scanner is used to scan the surface.

4. The method as claimed in claim 1, wherein an impregnated paper layer is placed on the filled in panel.

5. The method as claimed in claim 1, wherein a layer made of filler is scattered on an impregnated paper layer and the OSB is placed on the scattered layer before the scanning.

6. The method as claimed in claim 1, wherein the filled in panel is cured in a high-speed press.

7. The method as claimed in claim 1, wherein the filler includes a melamine resin or a phenol resin or a mixture of melamine resin and phenol resin which is scattered on the uneven portions and/or defects.

8. The method as claimed in claim 1, wherein a portion of wood flour in the filler is 30-60% by weight.

9. The method as claimed in claim 1, wherein the upper side of the panel which is manufactured without paper is surface-coated.

10. The method as claimed in claim 1, wherein said method is carried out with computer assistance.

11. The method as claimed in claim 1, further comprising placing an impregnated paper layer on the filled in mat or pressed panel, scattering a layer of a mixture of wood flour and duroplastic resin onto the impregnated paper layer and placing a further resin-impregnated paper layer on the scattered-on layer of the impregnated paper layer.

12. The method as claimed in claim 1, wherein holes and/or defects are only filled in starting from a defined area and/or depth.

13. The method as claimed in claim 12, wherein the position data and the distribution of the holes and/or defects are stored and used in a further processing operation of the OSB.

14. The method as claimed in claim 12, wherein in order to homogenize the surface after the filling in of the holes and/or defects on the upper side a complete layer of a mixture of wood flour and a duroplastic resin is scattered on.

15. The method as claimed in claim 1, wherein the filler contains additives.

16. The method as claimed in claim 15, wherein the additives are color pigments and/or reinforcement fibers and/or flame retardants.

17. The method as claimed in claim 1, wherein the targeted filling comprises filling selective ones of the uneven portions and/or defects with the filler.

18. The method as claimed in claim 17, wherein pre-defined uneven portions are tolerated.

19. The method as claimed in claim 18, wherein the uneven portions which exceed a depth of 2 mm and have a surface extent of more than 25 mm are filled with the filler using a scattering assembly which is located behind a scanner.

20. The method as claimed in claim 1, further comprising processing the position data into a digital map of the surface of the mat or of the pressed panel with x and y values in conjunction with z values so that the volume to be filled is inferred from the x, y and z values via area and depth.

21. The method as claimed in claim 20, wherein a quantity of the filler and/or a time period in which the filler is scattered is determined based on the volumes of the uneven portions and/or defects.

22. A method for producing an oriented strand board (OSB) in which a mat which is scattered from a plurality of layers of glued strands is pressed in a hot press to form a panel of a desired thickness, comprising: scanning a surface of an upper side of the mat or of the pressed panel in order to determine uneven portions and/or defects, determining position data of the determined uneven portions and/or defects, determining volumes of the individual uneven portions and/or defects, targeted filling in of the uneven portions and/or defects with a filler on the basis of the determined position data and the volumes in that the filler is scattered on with a scattering device, wherein when the uneven portions and/or defects are in the surface of the mat or of the pressed panel which is not yet divided up, the surface is subsequently pressed into its final smooth form in a press, and further comprising over filling the uneven portions and/or the defects with the filler to form a heap of powder and subsequently, pre-compressing the filler and after the pre-compression a quantity of a same composition of the filler is scattered onto an entire surface of the upper side.

23. The method as claimed in claim 22, further comprising taking into account a subsequent compression when filling in of the uneven portions and/or defects with the filler.

24. The method as claimed in claim 22, wherein the scanning digitizes the surface, and using a computer processes the digitized surface into a digital map of the surface with x and y values for position and, in conjunction with z values, the volume to be filled.

25. The method as claimed in claim 22, wherein the filler comprises a combination of wood dust and a powder of a duroplastic resin.

26. The method as claimed in claim 22, wherein the filler comprises color pigments.

27. The method as claimed in claim 22, wherein subsequent to the pre-compression, an impregnated paper layer is placed on the surface and is pressed into its final smooth form in the press.

* * * * *